United States Patent
Brahmaroutu

(10) Patent No.: US 8,650,342 B2
(45) Date of Patent: Feb. 11, 2014

(54) SYSTEM AND METHOD FOR DISTRIBUTED ADDRESS TRANSLATION IN VIRTUALIZED INFORMATION HANDLING SYSTEMS

(75) Inventor: Surender Brahmaroutu, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 1447 days.

(21) Appl. No.: 11/551,832

(22) Filed: Oct. 23, 2006

(65) Prior Publication Data

US 2008/0147925 A1  Jun. 19, 2008

(51) Int. Cl.
 *G06F 13/12* (2006.01)
(52) U.S. Cl.
 USPC .......................................................... 710/62
(58) Field of Classification Search
 USPC .......................................................... 710/62
 See application file for complete search history.

(56) References Cited

U.S. PATENT DOCUMENTS

| | | | |
|---|---|---|---|
| 5,551,000 A | 8/1996 | Tan et al. .................... 395/445 |
| 5,652,853 A * | 7/1997 | Duvalsaint et al. ........... 711/203 |
| 5,884,100 A | 3/1999 | Normoyle et al. ............ 395/872 |
| 5,987,557 A | 11/1999 | Ebrahim ....................... 710/200 |
| 6,047,332 A | 4/2000 | Viswanathan et al. ........ 709/245 |
| 6,163,806 A | 12/2000 | Viswanathan et al. ........ 709/229 |
| 6,553,435 B1 | 4/2003 | Normoyle et al. .............. 710/22 |
| 6,594,708 B1 | 7/2003 | Slaughter et al. ............. 709/315 |
| 6,611,883 B1 | 8/2003 | Avery ............................. 710/22 |
| 6,622,193 B1 | 9/2003 | Avery ........................... 710/263 |
| 6,704,831 B1 | 3/2004 | Avery ........................... 710/310 |
| 6,795,936 B2 | 9/2004 | Harris et al. .................... 714/42 |
| 6,813,653 B2 | 11/2004 | Avery ............................. 710/22 |
| 2007/0038840 A1 * | 2/2007 | Hummel et al. .............. 711/207 |

* cited by examiner

*Primary Examiner* — Henry Tsai
*Assistant Examiner* — Juanito Borromeo
(74) *Attorney, Agent, or Firm* — Terrile, Cannatti, Chambers & Holland, LLP; Robert W. Holland

(57) ABSTRACT

Virtualization of I/O devices to support operation of plural virtual machines on a host information handling system is managed with distributed translation agents that translate addresses generated from I/O devices according to mapping defined by a virtual machine monitor. The translation agents reside in the host I/O subsystem, such as at I/O hubs or at I/O devices. A discovery module discovers and configures plural translation agents to coordinate I/O device communications with translation of physical memory addresses and virtual I/O addresses.

5 Claims, 5 Drawing Sheets

SYSTEM AND METHOD FOR DISTRIBUTED ADDRESS TRANSLATION IN VIRTUALIZED INFORMATION HANDLING SYSTEMS

BACKGROUND OF THE INVENTION

1. Field of the Invention

The present invention relates in general to the field of virtualized information handling systems, and more particularly to a system and method for distributed address translation in virtualized information handling system.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems sometimes run plural virtual machines on a common hardware platform to support multiple users or multiple functions. Each virtual machine running on an information handling system platform typically has its own operating system which shares system resources with other operating systems, such as processor an memory resources. For example, physical input/output (I/O) devices are virtualized to allow shared physical access by the virtual machines to the physical I/O devices. The Directed I/O architecture of Intel Corporation and the IOMMU architecture of AMD each make provisions for translation of "guest" physical addresses associated with virtual machines to host physical addresses in the information handling system Root Complex (RC). In these architectures, a translation agent (TA) acts as a centralized logical entity in the RC that translates addresses generated from bus mastering DMA I/O devices to coordinate physical accesses to memory locations for virtualized I/O devices. The translation agent typically includes an access rights check to ensure that the DMA device is allowed to access the referenced memory locations. FIG. 1 depicts the presently contemplated architecture for centralized DMA address translations where an information handling system platform 10 supports plural virtual machines (VMs) 12. A virtual machine monitor (VMM) 14 running on a processor 16 establishes and revokes mappings to a memory 18 through a memory hub 20 through a translation agent 22 associated with memory hub 20. The centralized translation agent 22 coordinates accesses by virtual machines 12 to memory locations associated with I/O hub 24 and I/O devices 26.

Several difficulties arise with centralized DMA address translation in a host information handling system, as is depicted by FIG. 1. For instance, DMA access time is sometimes substantially lengthened due to the time involved in resolving physical addresses. In implementations that access a main memory-resident translation table, access times are typically significantly longer than the access times for untranslated accesses. Where a DMA transaction uses multiple memory accesses, such as for a table walk, then the memory transaction rate or overhead associated with the DMA transaction is often high. To mitigate these difficulties, the PCI-SIG IO workgroup has defined mechanisms that allow an I/O device to implement Address Translation Caches (ATC) similar to Translation Look-aside Buffers (TLB) associated with CPU accesses. However, the effectiveness of the ATC approach varies based on system configuration and usage models. The ATC approach is hampered because the centralized translation agent architecture does not scale well and offers a single point of failure in an information handling system. Generally, centralized translation agent control of device-to-device accesses is inefficient.

SUMMARY OF THE INVENTION

Therefore a need has arisen for a system and method which distributes address translations for virtualized information handling systems.

In accordance with the present invention, a system and method are provided which substantially reduce the disadvantages and problems associated with previous methods and systems for managing virtualized information handling system address translations. Translation agents are distributed to a host information handling system's I/O subsystem to support virtualization of I/O devices.

More specifically, a host information handling system supports operation of plural virtual machines with a hardware platform having a processor, memory and an I/O subsystem, such as a PCI Express USB subsystem. A virtual machine monitor supports operation of the plural virtual machines by establishing and revoking memory mappings for use by the virtual machines to access I/O devices of the I/O subsystem. The memory mappings defined by the virtual machine monitor are programmed into translation agents residing in the I/O subsystem to translate addresses generated from bus mastering DMA I/O devices so that access to referenced memory locations support operation of desired virtual machines. For example, the translation agents support I/O virtualization with Intel's Directed I/O or AMD's IOMMU architectures. The translation agents reside in I/O hubs of the I/O subsystem to perform DMA address translations for I/O devices supported by the I/O hubs. Alternatively, the translation agents reside in the I/O devices to perform DMA address translations at the I/O devices. A discovery module associated with the virtual machine monitor and/or the I/O subsystem discovers and configures the distributed translation agents.

The present invention provides a number of important technical advantages. One example of an important technical advantage is that address translations for virtualized information handling systems are distributed in the host information handling system. Distributed translation agents improve DMA access performance by reducing reliance on main memory-resident translation tables. Improved DMA access times substantially reduce memory transaction overhead for memory access intensive operations, such as table walks. Distribution of plural translation agents to I/O hubs or I/O devices provides improved scaling of I/O devices at a platform and removes the translation agent as a single point of failure. Distributed translation agents provide more efficient accesses than a centralized translation agent that attempts device-to-device accesses. Furthermore, third party virtual machine monitors or PCI managers working separately or in combination are able to discover and configure multiple distributed IOMMU in as system.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Distributed translation agents support virtualized I/O for virtual machine communication through physical I/O devices of a host information handling system by translating memory accesses at the host I/O subsystem. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of non-volatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
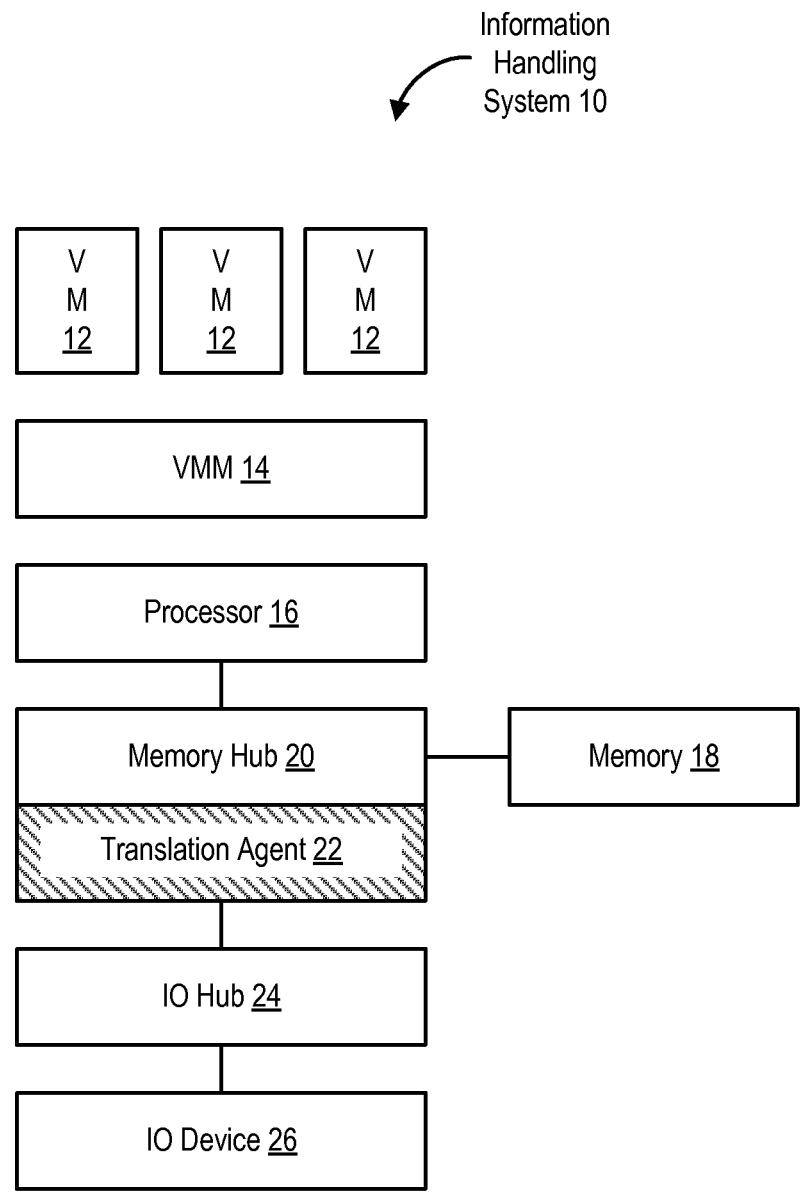
FIG. 1 depicts a block diagram of a prior art information handling system virtualized I/O device architecture having a centralized translation agent.
Figure 2:
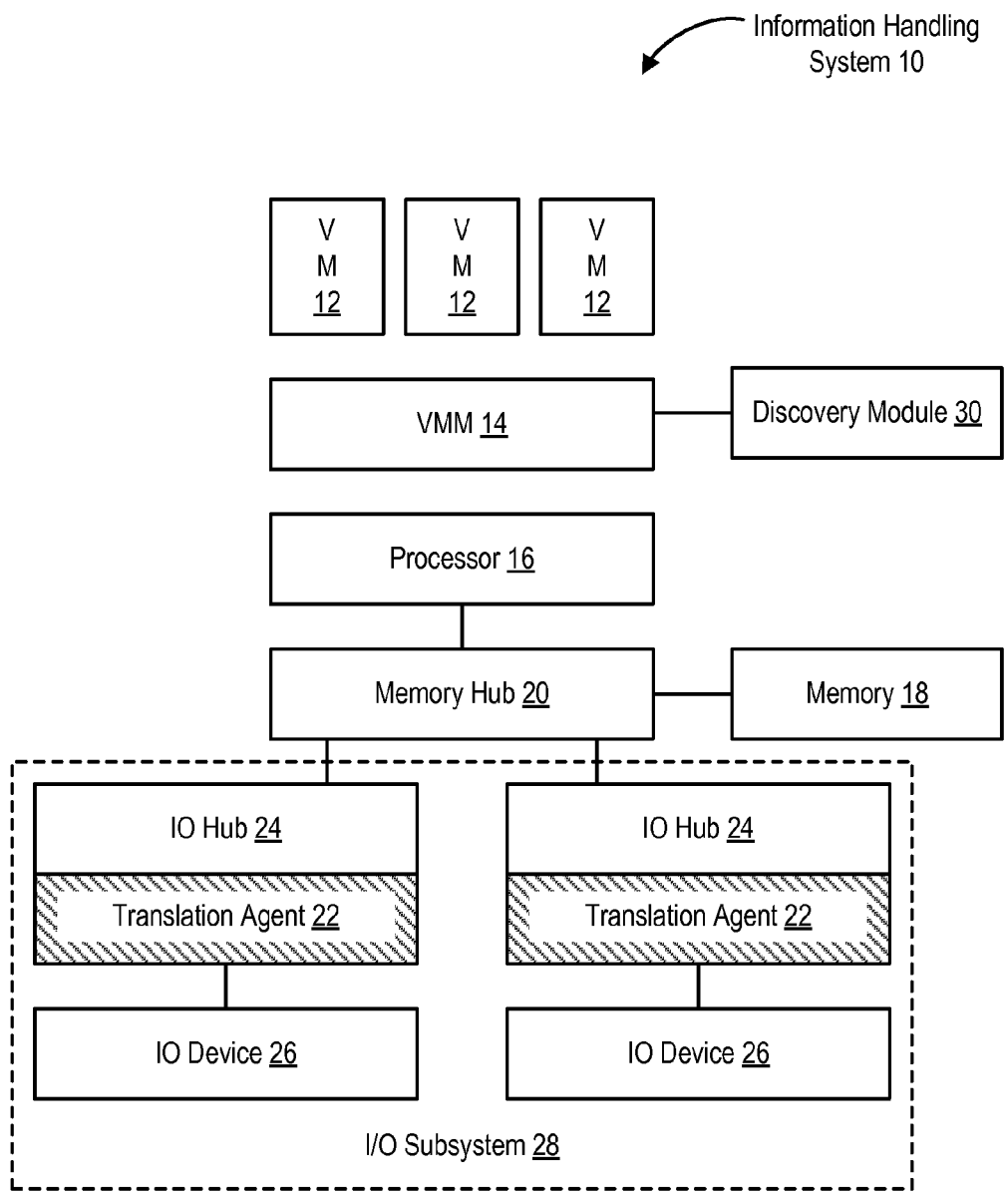
FIG. 2 depicts a block diagram of an information handling system having a distributed virtualized I/O architecture with plural translation agents distributed to I/O hubs.
Figure 3:
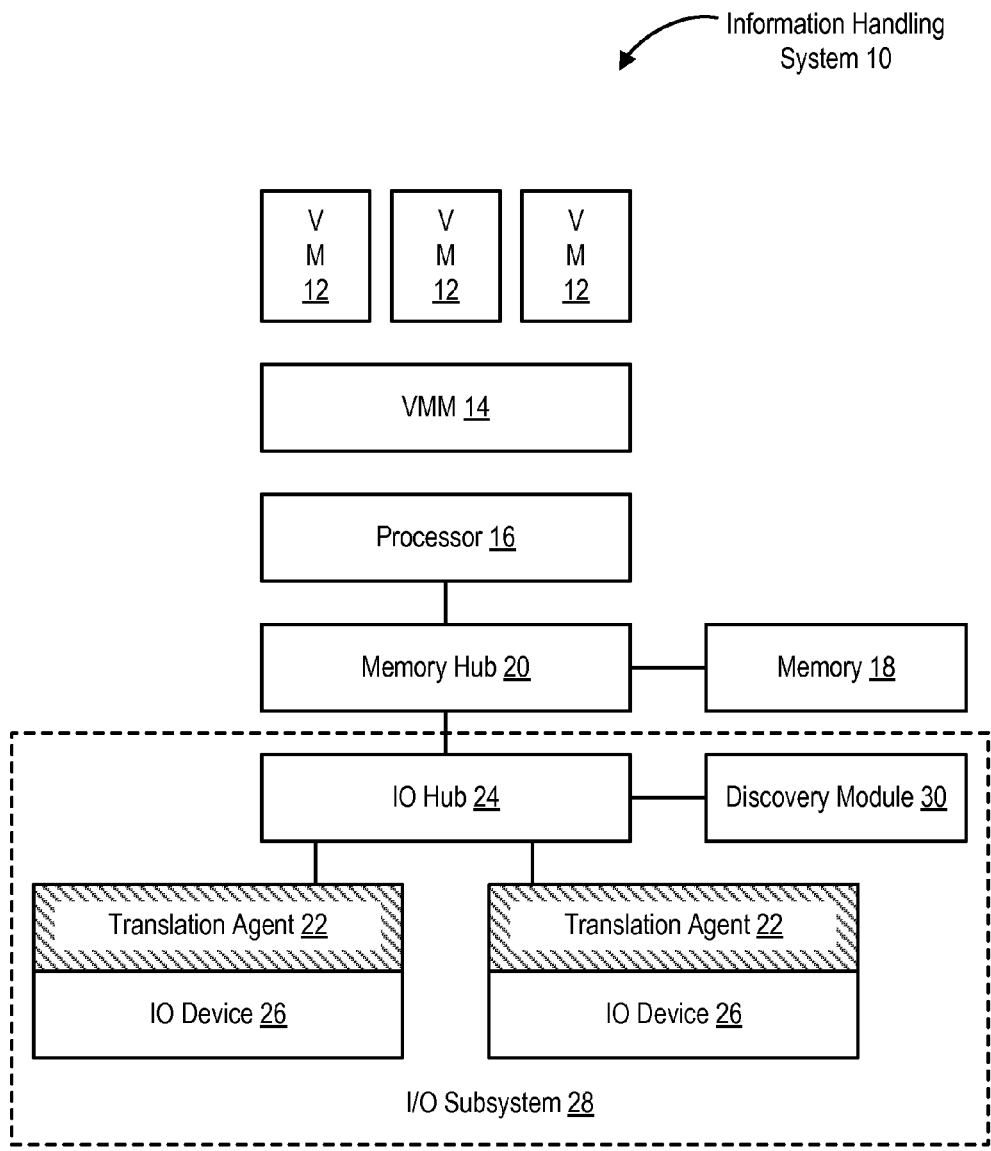
FIG. 3 depicts a block diagram of an information handling system having a distributed virtualized I/O device architecture with plural translation agents distributed to I/O devices.

Referring now to FIGS. 1-3, block diagrams depict information handling systems 10 with virtualized I/O device architectures having translation agents 22 to translate virtualized I/O device communications of virtual machines 12 to memory accesses used by physical I/O devices 26. Translation agents 22 translate guest physical addresses to host physical addresses in the Root Complex, as provided by the Intel Directed I/O and AMD IOMMU standards. Translation agent 22, as described herein, is a generic name for the Directed I/O and IOMMU logical entity in the Root Complex that translates addresses generated from bus mastering DMA I/O devices, typically including checks on the access rights of the DMA device to ensure that the device is allowed to access the reference memory locations. A virtual machine monitor 14 establishes and revokes mappings at translation agent 22 to map virtual I/O devices of virtual machines 12 to memory locations accessible by I/O devices 26. For example, each virtual machine 12 has an operating system that accepts inputs through a common USB keyboard and that presents visual information through a common PCI Express display device. Each virtual machine 12 communicates with I/O devices 26 by writing and reading information from addresses in memory 18 that are defined by virtual machine monitor 14. Translation agent 22 translates addresses generated by I/O devices 26 for reads and writes so that I/O devices 26 write to memory addresses associated with a desired virtual machine 12. In this way, plural virtual machines 12 share common I/O devices 26.

FIG. 1 depicts a centralized architecture currently contemplated by industry in which has translation agent 22 resides in memory hub 20. However, this centralized architecture has performance implications for DMA accesses, such as increased memory transaction rates and difficulty in scaling to hosts of varying size. To reduce these performance implications, the present invention distributes transaction agent 22 to reside in the I/O subsystem 28 that includes I/O hub 24 and I/O devices 26. For example, FIG. 2 depicts a transaction agent 22 distributed in each of plural I/O hubs 24 of I/O subsystem 28, and FIG. 3 depicts a transaction agent 22 distributed in each of plural I/O devices 26 of I/O subsystem 28. Translation agent 22 provides DMA address translations within I/O subsystem 28 based on mappings defined by virtual machine monitor 14. As virtual machine monitor 14 establishes and revokes mapping for memory accesses to support operation of virtual machines 12, the mappings are sent to translation agent 22 and applied at I/O subsystem 28, thus reducing reliance on main memory-resident access to translate physical addresses to host addresses. A discovery module 30 discovers and configures translation agents 22 distributed through host information handling system 10 so that virtual machine monitor 14 can update memory mappings at translation agents 22 to support virtualized I/O. In FIG. 2, discovery module 30 is implemented as instructions associated with virtual machine monitor 14. In FIG. 3, discovery module 30 is implemented as instructions associated with I/O subsystem 28, such as at a PCI Manager that manages PCI Express I/O devices 26.

Figure 4:
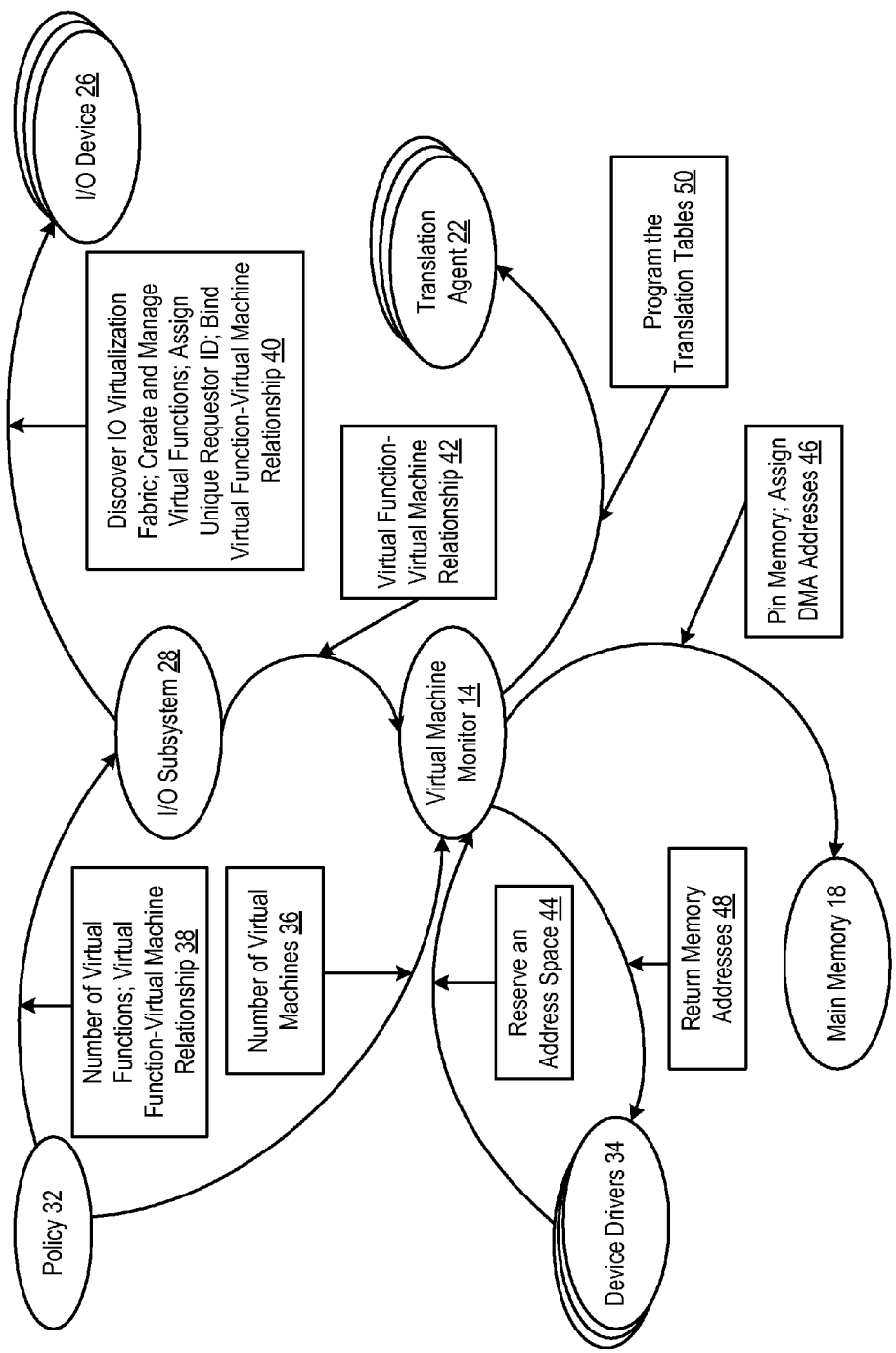
FIG. 4 depicts a state diagram of an information handling system host discovery and configuration of plural translation agents that support virtualized I/O.

Referring now to FIG. 4, a state diagram depicts an information handling system host discovery and configuration of plural translation agents that support virtualized I/O. At an initial state, policies 32 are retrieved to define the number of virtual machines at transition 36 and to define the number of virtual functions and the virtual function-to-virtual machine relationship at transition 38. I/O subsystem 28, such as a PCI Manager, applies the virtual function and virtual machine relationships at transition 40 to discover the I/O virtualization fabric, to create and manage the virtual functions, to assign Requestor IDs and to bind the virtual function and virtual machine relationship at I/O device 26. At transition 42, the virtual function and virtual machine relationship is provided from I/O subsystem 28 to virtual machine monitor 14. At transition 44, I/O device drivers 34 reserve address space with virtual machine monitor 14. Once virtual machine monitor 14 has the number of virtual machines, the virtual function and virtual machine relationships and the address space need by the I/O device drivers, configuration of memory and defining of address relationships in transition agent 22 is completed. At step 46, DMA memory addresses are defined in main memory 18 and, at step 48, the memory addresses are provided to device drivers 34. At step 50, translation agents 22 are programmed with the DMA memory addresses.

Figure 5:
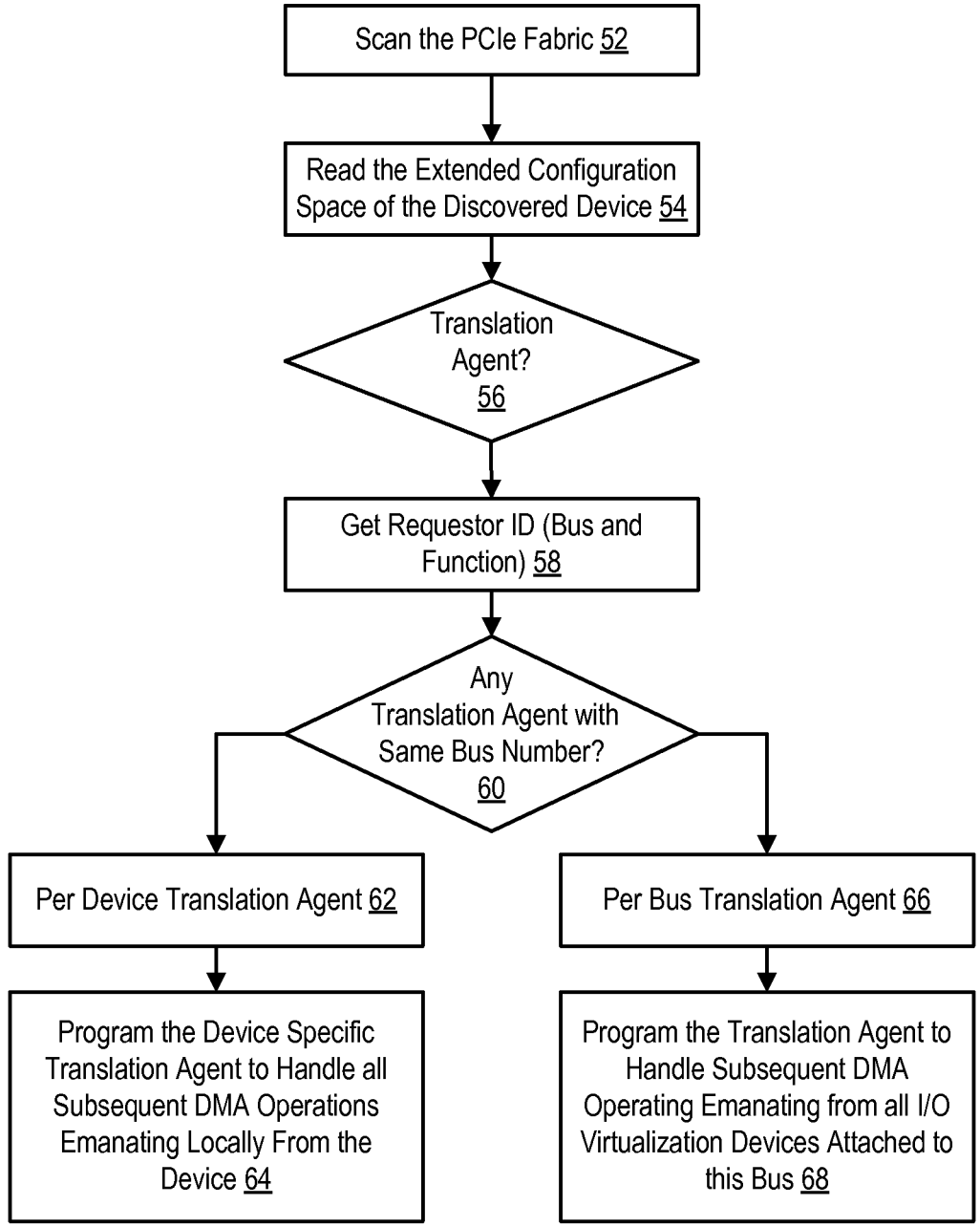
FIG. 5 depicts a flow diagram of a process for discovery and configuration of plural translation agents that support virtualized I/O.

Referring now to FIG. 5, a flow diagram depicts a process for discovery and configuration of plural translation agents that support virtualized I/O. The example embodiment depicted by FIG. 5 shows a PCI Manager configuration based on translation agents residing at the I/O hub or the I/O device. At step 52, a scan of the PCI Express fabric is performed to discover devices interfaced with the fabric. At step 54, the extended configuration space of a discovered device is read to determine at step 56 whether a translation agent is present. If a translation agent is not present, the process returns to step 54 to continue with remaining devices. If at step 56 a translation agent is found, the process continues to step 58 to get the Requestor ID associated with the translation agent including the bus and function. At step 60, a determination is made of whether any of the translation agents have the same bus number. If so, the process continues to step 62 to determine a configuration of a translation agent for each I/O device and, at step 64, each device specific translation agent is programmed to handle all subsequent DMA operations emanating locally from the device. If at step 60 the translation agents do not have the same bus number, then at step 66 a determination is made that the translation agents reside at the I/O hub. At step 68, the translation agents are programmed to handle all subsequent DMA operations emanating from all I/O virtualization devices attached to the bus.

Although the present invention has been described in detail, it should be understood that various changes, substitutions and alterations can be made hereto without departing from the spirit and scope of the invention as defined by the appended claims.

What is claimed is:

1. An information handling system comprising:
a processor operable to run one or more virtual machines;
a memory hub interfaced with the processor and operable to coordinate access to memory for storing or retrieving information;
memory interfaced with the memory hub and operable to store information;
an I/O subsystem interfaced with the memory hub and operable to coordinate inputs and outputs;
a virtual machine monitor running on the processor and operable to coordinate operation of plural virtual machines by establishing and revoking mappings between the virtual machines and the memory; and
one or more translation agents associated with the I/O subsystem and interfaced with the virtual machine monitor, each translation agent operable to track mappings established and revoked by the virtual machine monitor and to translate addresses generated from I/O devices with the mapping for use with the virtual machines;
wherein the I/O subsystem comprises one or more I/O hubs and one or more I/O devices and wherein the one or more translation agents reside on each I/O device.

2. An information handling system comprising:
a processor operable to run one or more virtual machines;
a memory hub interfaced with the processor and operable to coordinate access to memory for storing or retrieving information;
memory interfaced with the memory hub and operable to store information;
an I/O subsystem interfaced with the memory hub and operable to coordinate inputs and outputs;
a virtual machine monitor running on the processor and operable to coordinate operation of plural virtual machines by establishing and revoking mappings between the virtual machines and the memory;
one or more translation agents associated with the I/O subsystem and interfaced with the virtual machine monitor, each translation agent operable to track mappings established and revoked by the virtual machine monitor and to translate addresses generated from I/O devices with the mapping for use with the virtual machines; and
a discovery module operable to discover and configure plural translation agents residing in the I/O subsystem.

3. The information handling system of claim 2 wherein the discovery module comprises instructions associated with the virtual machine monitor.

4. The information handling system of claim 2 wherein the discovery module comprises instructions associated with the I/O subsystem.

5. The information handling system of claim 4 wherein the I/O subsystem comprises a PCI Manager and the discovery module resides on the PCI Manager.

\* \* \* \* \*